United States Patent
Ekberg

(10) Patent No.: US 9,596,208 B2
(45) Date of Patent: Mar. 14, 2017

(54) EVENT BASED SOCIAL NETWORKING

(71) Applicant: Lane A. Ekberg, Salt Lake City, UT (US)

(72) Inventor: Lane A. Ekberg, Salt Lake City, UT (US)

( * ) Notice: Subject to any disclaimer, the term of this patent is extended or adjusted under 35 U.S.C. 154(b) by 180 days.

(21) Appl. No.: 13/764,686

(22) Filed: Feb. 11, 2013

(65) Prior Publication Data

US 2013/0212199 A1     Aug. 15, 2013

Related U.S. Application Data

(60) Provisional application No. 61/596,981, filed on Feb. 9, 2012, provisional application No. 61/665,163, filed on Jun. 27, 2012, provisional application No. 61/702,374, filed on Sep. 18, 2012.

(51) Int. Cl.
| | | |
|---|---|---|
| *G06F 15/16* | (2006.01) | |
| *H04L 12/58* | (2006.01) | |
| *G06Q 50/00* | (2012.01) | |
| *G06Q 10/10* | (2012.01) | |

(52) U.S. Cl.
CPC ............. *H04L 51/32* (2013.01); *G06Q 10/10* (2013.01); *G06Q 50/01* (2013.01)

(58) Field of Classification Search
None
See application file for complete search history.

(56) References Cited

U.S. PATENT DOCUMENTS

| | | |
|---|---|---|
| 7,310,676 B2 | 12/2007 | Bourne |
| 7,593,740 B2 | 9/2009 | Crowley et al. |
| 7,809,805 B2 | 10/2010 | Stremel et al. |
| 8,380,801 B2 * | 2/2013 | Sherrets et al. ............... 709/206 |
| 8,667,009 B2 * | 3/2014 | Voigt et al. .................... 707/769 |
| 2007/0162547 A1 * | 7/2007 | Ross ....................... G06Q 10/10 709/204 |
| 2007/0282621 A1 | 12/2007 | Altman et al. |
| 2008/0120396 A1 | 5/2008 | Jayaram et al. |
| 2009/0070334 A1 | 3/2009 | Callahan et al. |

(Continued)

FOREIGN PATENT DOCUMENTS

KR     1020100102696         9/2010

OTHER PUBLICATIONS

PCT/US2013/025641, International Search Report and Written Opinion, May 29, 2013.

(Continued)

*Primary Examiner* — Brian P Whipple
*Assistant Examiner* — Gregory P Tolchinsky
(74) *Attorney, Agent, or Firm* — Kunzler Law Group

(57) ABSTRACT

A method, apparatus, and computer program product are disclosed for facilitating networked communication. An event creation module is configured to create an event profile within a social networking service. A check in module is configured to associate a plurality of user profiles of the social networking service with the event profile. A message interface module is configured to provide a message interface in response to determining that a user profile of a first user of the social networking service and a user profile of a second user of the social networking service are associated with the event profile. The message interface is operable by the first user to send a private message to the second user.

15 Claims, 7 Drawing Sheets

(56) References Cited

U.S. PATENT DOCUMENTS

| | | | |
|---|---|---|---|
| 2010/0153284 | A1 | 6/2010 | Hoag et al. |
| 2011/0254792 | A1* | 10/2011 | Waters .................. G06F 1/1626 345/173 |
| 2011/0276396 | A1* | 11/2011 | Rathod ...................... 705/14.49 |
| 2011/0302263 | A1 | 12/2011 | Quoc et al. |
| 2011/0302504 | A1* | 12/2011 | Khare et al. .................. 715/751 |
| 2011/0307339 | A1 | 12/2011 | Russell et al. |
| 2011/0307399 | A1 | 12/2011 | Homes |
| 2012/0030282 | A1* | 2/2012 | Brody et al. .................. 709/203 |
| 2012/0150960 | A1* | 6/2012 | Nalawade .................... 709/204 |
| 2013/0036165 | A1* | 2/2013 | Tseng et al. .................. 709/204 |
| 2013/0198008 | A1 | 8/2013 | Kendall et al. |

OTHER PUBLICATIONS

PCT/US2014/062285, International Search Report and Written Opinion, Jan. 29, 2015.

\* cited by examiner

EVENT BASED SOCIAL NETWORKING

CROSS-REFERENCES TO RELATED APPLICATIONS

This application claims the benefit of U.S. Provisional Patent Application No. 61/596,981 entitled "SOCIAL SOFTWARE METHOD OF PUBLICALLY SHARING AND COLLECTING PROFILE INFORMATION AT AN EVENT OR OBJECT TARGET PROFILE" and filed on Feb. 9, 2012 for Lane A. Ekberg, U.S. Provisional Patent Application No. 61/665,163 entitled "GEOLOCATION SOFTWARE METHOD OF SHARING USER PROFILE INFORMATION TO HARVEST SOCIAL RELEVANCE THROUGH A PROMOTED EVENT/VENUE SOCIAL POOL TARGET" and filed on Jun. 27, 2012 for Lane A. Ekberg, and U.S. Provisional Patent Application No. 61/702,374 entitled "FORMING VIRTUAL SOCIAL ECOSYSTEMS ALONGSIDE PHYSICAL EVENT SPACES THAT GATHER GROUPS OF PEOPLE DURING AN EVENT OR ACTIVITY" and filed on Sep. 18, 2012 for Lane A. Ekberg, each of which is incorporated herein by reference.

TECHNICAL FIELD

The present disclosure, in various embodiments, relates to communication, and more particularly relates to communication between users of a social networking service.

BACKGROUND

Many people use social networking services to connect with other people over a computer network, such as the internet, for personal or business purposes. For example, two people who meet in person at an event may use a social networking service to continue a dating relationship, a friendship, a business relationship, or the like. Some people may also use a social networking service to begin a personal or business relationship with another user of the social networking service, even if they have not yet met in person.

Many users of a social networking service have public user profiles, which allow other users to contact them, or send messages, to begin an online relationship. However, users with public user profiles have an increased risk of receiving mean, crude, or otherwise undesirable messages, because any member of the general public may communicate with them. Other users of a social networking service may have private user profiles, which block communication, except from members of an existing social network of affiliated users. Although a private user profile may block undesirable messages, it may also prevent a user from receiving desirable communication from new acquaintances.

Additionally, it may be difficult to find a user profile for a new acquaintance on a social networking service. Depending on the number of users, a user profile search may return a large number of public user profiles, and new acquaintances may not know enough about each other to effectively narrow the search. Also, a user profile search may exclude private user profiles from the search results.

SUMMARY

A method is presented for facilitating networked communication. In one embodiment, the method includes creating an event profile within a social networking service. In some embodiments, the method includes associating a plurality of user profiles of the social networking service with the event profile. In a certain embodiment, the method includes providing a message interface in response to determining that a user profile of a first user of the social networking service and a user profile of a second user of the social networking service are associated with the event profile. In a further embodiment, the message interface is operable by the first user to send a private message to the second user.

In one embodiment, the method includes using a plurality of filter categories associated with the event profile to categorize each user profile of the plurality of user profiles. In a certain embodiment, the plurality of filter categories includes a business category, a dating category, and/or a friendship category. In a further embodiment, the plurality of filter categories includes a promotional category definable by an administrator for promoting a business, location, good, and/or service associated with the event profile.

In one embodiment, the method includes displaying information about the event profile. In a certain embodiment, the displayed information includes one or more links to one or more user profiles of the plurality of user profiles. In a further embodiment, the method includes using a plurality of filter categories associated with the event profile to categorize the one or more links.

In one embodiment, associating a plurality of user profiles with the event profile includes determining that a location for at least one user profile satisfies one or more location criteria for the event profile. In some embodiments, the private message may include an email message, a chat message, a video message, and/or an audio message. In certain embodiments, the method includes providing a storefront interface associated with the event profile. In some embodiments, the method includes providing a classified marketplace interface associated with the event profile.

An apparatus is presented for facilitating networked communication. In one embodiment, an event creation module is configured to create an event profile within a social networking service. In some embodiments, a check in module is configured to associate a plurality of user profiles of the social networking service with the event profile. In a certain embodiment, a message interface module is configured to provide a message interface in response to determining that a user profile of a first user of the social networking service and a user profile of a second user of the social networking service are associated with the event profile. In a further embodiment, the message interface is operable by the first user to send a private message to the second user. In certain embodiments, the event creation module, the check in module, and the message interface module include logic hardware and/or executable code. In further embodiments, the executable code is stored on a computer readable storage medium.

In one embodiment, a filter category module is configured to use a plurality of filter categories associated with the event profile to categorize each user profile of the plurality of user profiles. In some embodiments, the plurality of filter categories includes a business category, a dating category, and/or a friendship category. In a certain embodiment, an event map module is configured to display a map including a link to the event profile. In a further embodiment, the link is positioned at a location on the map corresponding to a location for the event profile. In some embodiments the message interface includes a message filter operable by the second user to block one or more messages from the first user.

In one embodiment, a user profile information module is configured to display information about one user profile. In a further embodiment, the information includes a link to a viewed user profile and/or a link to a viewer user profile. In some embodiments, a physical attendee module is configured to categorize at least one user profile of the plurality of user profiles as a physical attendee for the event profile, in response to determining that a location for the at least one user profile satisfies one or more location criteria for the event profile.

In one embodiment, a related event module is configured to display information about the event profile. In a further embodiment, the displayed information includes one or more links to one or more related event profiles. In some embodiments, an event feedback module is configured to display information about the event profile. In further embodiments, the displayed information includes user feedback about the event profile. In a certain embodiment, an advertisement module is configured to display information about the event profile with advertisements.

A computer program product is presented to perform operations for facilitating networked communication. In certain embodiments, the computer program product includes a computer readable storage medium storing computer usable program code executable to perform the operations of the computer program product. In one embodiment, the operations include creating an event profile within a social networking service. In some embodiments, the operations include associating a plurality of user profiles of the social networking service with the event profile. In a certain embodiment, the operations include providing a message interface in response to determining that a user profile of a first user of the social networking service and a user profile of a second user of the social networking service are associated with the event profile. In a further embodiment, the message interface is operable by the first user to send a private message to the second user. In one embodiment, the operations include using a plurality of filter categories associated with the event profile to categorize each user profile of the plurality of user profiles. In a further embodiment, the plurality of filter categories includes a business category, a dating category, and/or a friendship category.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1:
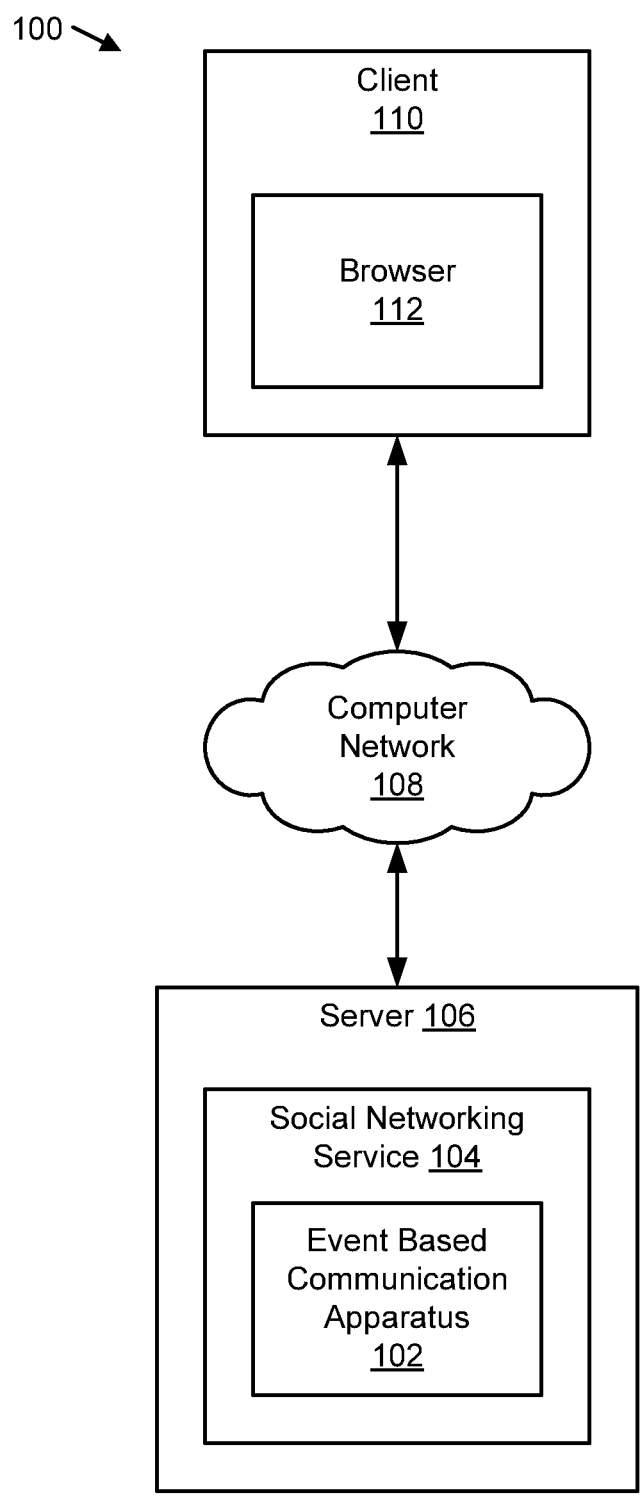
FIG. 1 is a schematic block diagram illustrating one embodiment of a system for facilitating networked communication.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description.

FIG. 1 depicts one embodiment of a system 100 for facilitating networked communication. In the depicted embodiment, the system 100 includes an event based communication apparatus 102 operating within a social networking service 104 on a server 106, as well as a computer network 108, and a client 110 including a browser 112, which are described below.

In one embodiment, the system 100 includes an event based communication apparatus 102. In a further embodiment, the event based communication apparatus 102 operates within a social networking service 104 to facilitate communication between users of the social networking service 104. The event based communication apparatus 102 is described in more detail below with respect to FIG. 2 and FIG. 3.

In one embodiment, a social networking service 104 may facilitate communication over a computer network 108, thereby facilitating online or real-life relationships between its users. In a variety of embodiments, a social networking service 104 may facilitate various types of relationships, such as dating relationships, friendships, business relationships, or the like, and combinations thereof. For example, in one embodiment, a social networking service 104 may focus on facilitating friendships. In another embodiment, a social networking service 104 may focus on facilitating business relationships. In yet another embodiment, a social networking service 104 may facilitate a variety of different types of relationships.

In one embodiment, a social networking service 104 may allow users to form affiliations within the social networking service 104. In various embodiments, various social networking services 104 may describe affiliated users using terms such as "friends," "connections," "followers," or the like. In further embodiments, a user's "social network" may refer to the user's affiliated users, their affiliated users, and so on, so that a graph of the user's social network forms a net-like structure. The terms "social network" and "social networking service" may be applicable to this net-like social structure whether referring to a business social network, a personal social network, or a social network combining business and personal relationships. In another embodiment, a social network may refer to a user's network of business and/or personal contacts who communicate using a social networking service 104, even if they are not designated as affiliated within the social networking service 104.

In one embodiment, a social networking service 104 may be open to the public. In another embodiment, the social networking service 104 may be open to limited membership. For example, in a certain embodiment, a social networking service 104 may be open only to students at a particular university. In another embodiment, a social networking service 104 may facilitate communication over a corporate intranet, and may be accessible only to employees of the corporation. In light of this disclosure, it is clear that many types of social networking service 104 are possible In the depicted embodiment, the social networking service 104 operates on a server 106. In another embodiment, the social networking service 104 may use a plurality of servers 106. In various embodiments, a server 106 may include a mainframe computer, a blade server, a workstation, a desktop or other computer, or the like. The server 106, in one embodiment, may include a plurality of processors, such as a partitioned mainframe with multiple operating system instances. In another embodiment, the server 106 may include a single processor. In a further embodiment, the server 106 may include one or more subsystems, such as a storage area network. The server 106 may access internal storage or external storage accessible through a network. In one embodiment, the server 106 may be part of a server farm controlled by a company that provides a social networking service 104. In light of this disclosure, it is clear that many types of server 106 may be used with a social networking service 104.

In the depicted embodiment, the system 100 includes a computer network 108 in communication with the server 106 and the client 110. In one embodiment, the computer network 108 may be a single network. In another embodiment, the computer network 108 may include several networks linked together. In a various embodiments, the computer network 108 may include various network types, such as a local area network ("LAN"), wide area network ("WAN"), wireless network, or the like, as well as combinations of network types. In a certain embodiment, the computer network 108 may be a public network such as the internet. In another embodiment, the computer network 108 may be a virtual private network operating over a public network. In yet another embodiment, the computer network 108 may be a private network, such as a corporate intranet.

In one embodiment, the computer network 108 may include hardware such as the server 106, routers, switches, cabling, and other communication hardware. In a further embodiment, the computer network 108 may also include computer readable storage media, such as a hard disk drive, an optical drive, non-volatile memory, random access memory ("RAM"), or the like. In light of this disclosure, many types of computer network 108, and components of a computer network 108, are clear.

In the depicted embodiment, the system 100 includes a client 110. In one embodiment, a user accesses the social networking service 104 by using the client 110 to communicate with the server 106 over the computer network 108. In various embodiments, the client 110 may be a desktop computer, laptop computer, netbook, tablet, mobile phone, or the like. Although, only one client 110 is shown in FIG. 1, the system 100, in a further embodiment, may include multiple clients 110. For example, in one embodiment, each user of the social networking service 104 may use a separate client 110 connected to the computer network 108 in order to access the social networking service 104. In another embodiment, a single user may use multiple clients 110. For example, a user may access the social networking service 104 using a desktop computer as a client 110 at home, and using a mobile phone as a client 110 away from home. In yet another embodiment, multiple users may access the social networking service 104 using a shared client 110, such as a family computer. In light of this disclosure, it is clear that many types of devices are suitable for use as a client 110.

In one embodiment, the system 100 includes a browser 112, which presents information from the social networking service 104 to a user. In the depicted embodiment, the browser 112 is an application installed on the client 110. In another embodiment, the browser 112 is located external to the client 110, but accessed by the client 110. For example, in various embodiments, the browser 112 may be located on a server 106, storage area network, cloud storage, or the like. In one embodiment, the browser 112 may be a general purpose application, which displays information from the social networking service 104, or from other sources. For example, in a further embodiment, the browser 112 may be a web browser, which displays information from the social networking service 104 as a web page, and which is also capable of displaying other web pages. In another embodiment, the browser 112 may be a specific purpose application, used specifically for the social networking services 104. For example, if the client 110 is a mobile phone, the social networking service 104 may provide basic functionality when the browser 112 is a mobile phone web browser, but may be able to provide enhanced functionality when the browser 112 is a mobile app used specifically for the social networking service 104. In light of this disclosure, it is clear that many types of browser 112 may be used with the system 100.

Although the above-disclosed browsers 112 display information in visual form, other types of browsers 112 may be used in other embodiments, to present information in non-visual form. For example, a browser 112 for a blind person may include a screen reader, which audibly reads information from the social networking service 104 instead of, or in addition to displaying it on a screen. For simplicity, the word "display" is used herein to refer to the presentation of information in visual and/or non-visual form, and is not intended to limit this disclosure to visible displays.

Figure 2:
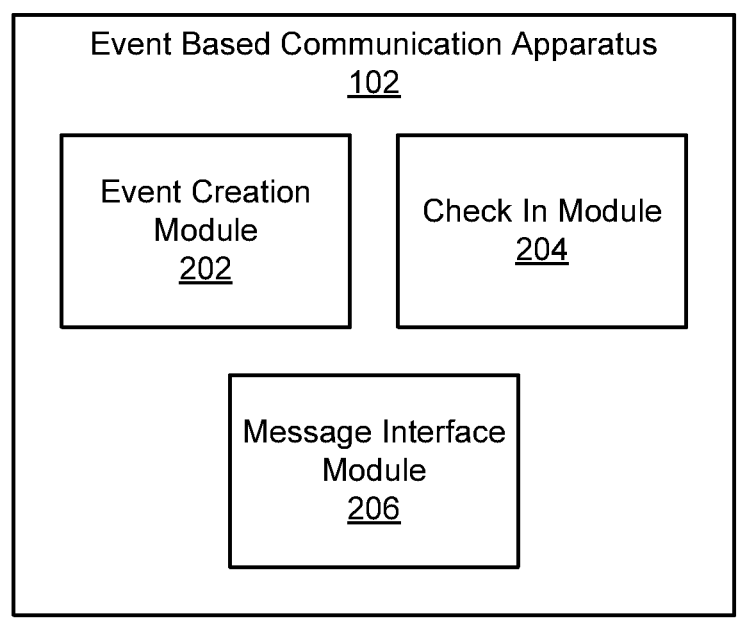
FIG. 2 is a schematic block diagram illustrating one embodiment of an apparatus for facilitating networked communication.

FIG. 2 depicts one embodiment of an apparatus 200 for facilitating networked communication. In the depicted embodiment, the apparatus 200 includes an event based communication apparatus 102, which includes an event creation module 202, a check in module 204, and a message interface module 206, as described below.

In general, the event based communication apparatus 102 provides a message interface, so that users of a social networking service 104 can communicate with each other privately if they are attending the same event. In one embodiment, the event based communication apparatus 102 may facilitate networked communication by providing a location based social search, which allows users to find other users or events by location. Facilitating networked communication between event attendees allows users to avoid using a fully public user profile on the social networking service 104, and thus avoid the increased risk of receiving mean, crude, or otherwise undesirable messages from members of the general public. The event based communication apparatus 102 also allows event attendees to find each other on the social networking service 104 more easily than by using a user profile search, because their user profiles are linked to the event.

In one embodiment, the event creation module 202 is configured to create an event profile within the social networking service 104. An event profile may be a virtual object, web page, interface, portal, tag, code, or the like within a social networking service 104, which corresponds to an event. In various embodiments, an "event" may be an occasion, location, virtual event, or the like, so that in some cases a person who attends an event may not be physically present. For example, in one embodiment, an event may be a real-world event at a particular time and venue, such as a trade show, a concert, a speed-dating event, or the like. In another embodiment, however, an event may be an online gathering, such as a virtual meeting, or online conversation between event attendees at various locations. One type of event, in a certain embodiment, may be a location. For example, an event may be a city, so that the attendees are citizens, or may be a mountain, so that the attendees are people interested in climbing or hiking on that mountain. In a further embodiment, a virtual event may have no particular time and location, but may simply indicate some affiliation of the attendees. For example, the event may be an organization so that the attendees are members of the organization, or may be a brand, so that the attendees are people who have indicated that they like the products sold under that brand. In light of this disclosure it is clear that other types of events are possible, for which the event creation module 202 may create an event profile.

In one embodiment, the event creation module 202 creates the event profile in response to receiving information about the event from a user of the social networking service 104. For example, an owner of a bar or club planning a dating event could fill out a form on a website for the social networking service 104, causing the event creation module 202 to create an event profile for the dating event. In another embodiment, the event creation module 202 creates the event profile in response to receiving information about the event from an administrator of the social networking service 104. For example, an administrator could pre-populate the social networking service 104 with information about well known events, such as trade shows, or popular locations, causing the event creation module 202 to create event profiles for the pre-populated events. In a further embodiment, the event creation module 202 may be configured to create event profiles in response to receiving information without ongoing user or administrator intervention. For example, in a certain embodiment, the event creation module 202 could be connected to the internet to find cruise ship itineraries and automatically create an event profile for each cruise. In another embodiment, the event creation module 202 could import information from an online events calendar, such as a city events calendar, to automatically create event profiles for the calendared events.

In one embodiment, the event creation module 202 may categorize each event profile within a plurality of event types. In various embodiments, other modules, such as the event information module 308 or the event map module 310 described below with reference to FIG. 3, or similar modules, may display the event type with information about the event, or may allow users to filter a list or other display of events by event type. An event type may include a public event, private event, outdoor event, family event, brand-sponsored event, virtual event, guestbook event, object event, lost-and-found event, or the like. In light of this disclosure, it is clear that many different event types may be used to categorize event profiles.

In one embodiment, the check in module 204 is configured to associate a plurality of user profiles of the social networking service 104 with an event profile created by the event creation module 202. In one embodiment the check in module 204 may associate a user profile with the event profile when the user "checks in" to the event, using a button or link on a website, mobile application, or the like for the social networking service 104. In a certain embodiment, the check in module 204 may associate a user profile with the event profile by using an automatic check in process. For example, if the client 110 provides the user's location, the user may be automatically checked in to the event based on his or her location, as described below with reference to the location check in module 302 of FIG. 3. In a further embodiment, the check in module 204 may dissociate the user's user profile from the event profile when the user "checks out" of the event, either manually or automatically, as described above with reference to checking in.

A user profile may be a virtual object, page, interface, portal, tag, code, or the like that is controlled or managed by a user of the social networking service 104. In many social networking services 104, a user profile may include or reference information about the user, such as hobbies, business interests, or the like. However, in other embodiments, a user profile may include or reference information about something other than the user. For example, in one embodiment, a product vendor may check into a trade show with multiple user profiles, including a personal user profile, and an object user profile for the product. In various embodiments, a user profile may include or reference information about various types of physical or virtual objects, such as a wireless network, a poll, a museum piece, a person other than the user, a newspaper, a magazine, a picture, an article, a car, an animal, a house, a trail, a landmark, a product, a location for lost and found items, and the like.

Because the event based communication apparatus 102 facilitates communication between user profiles, user profiles for objects (or subjects other than the user) may be useful to categorize a user's communication. For example, a vendor with multiple products could check into a trade show event using multiple user profiles for the different products, to keep track of which messages were about which products.

In one embodiment, the message interface module 206 is configured to provide a message interface operable by a first user of the social networking service 104 to send a private message to a second user of the social networking service 104. Sending private messages allows event attendees to have one-on-one conversations over the social networking service 104, which are not seen by other users of the social networking service 104. In a further embodiment, the message interface module 206 may provide the message interface in response to determining that the check in module 204 has associated the first user's user profile and the second user's user profile with the same event profile. Providing a message interface in response to determining that two users are checked in to the same event allows new acquaintances from the event to easily contact each other and continue a business or personal relationship over the social networking service 104, but also protects users' privacy by limiting the ability to send messages to co-attendees at the same event instead of allowing the general public to send messages to a user.

In one embodiment, the message interface may include one or more links on a web page or interface for an event, so that selecting different links allows various types of private messages to be sent to various users who are checked in to the event. In a certain embodiment, the message interface module 206 may provide a message interface operable to send both private and public messages to event attendees. For example, in one embodiment, the message interface may include a first link to send a private message to an attendee at the event, and a second link to post a public message to a forum for the event.

In various embodiments, a public message or private message may take various forms. For example, a message may be an email message, a chat message, a video message, an audio message, or the like. In one embodiment, an email message may be sent to an email account separate from the social networking service 104. In another embodiment, an email message may be sent to an email account created for a user within the social networking service 104. In light of this disclosure, it is clear that other types of messages may also be used with the message interface.

In one embodiment, sending a private message may include sending an email. In another embodiment, sending a private message may include opening a chat session and sending the first message for the chat session. In various embodiments, sending a message to the second user may include making a message available to the second user in a variety of ways, whether or not the second user chooses to read, view, listen to, or otherwise receive the message.

In various embodiments, the message interface module 206 may provide a message interface with various other functions. For example, if an event is held at a bar, the message interface may include a link for one user to buy a drink for another user, which sends the price of a drink from the first user to the bar, and provides a code that the second user can use to redeem the drink. In a further embodiment, the message interface module 206 may limit the number of drinks bought for one person, so as not to encourage excessive drinking. In another embodiment, if an event is a business event, the message interface may include a link to send documents with a message. In light of this disclosure, many functions are clear that may be provided by the message interface.

Figure 3:
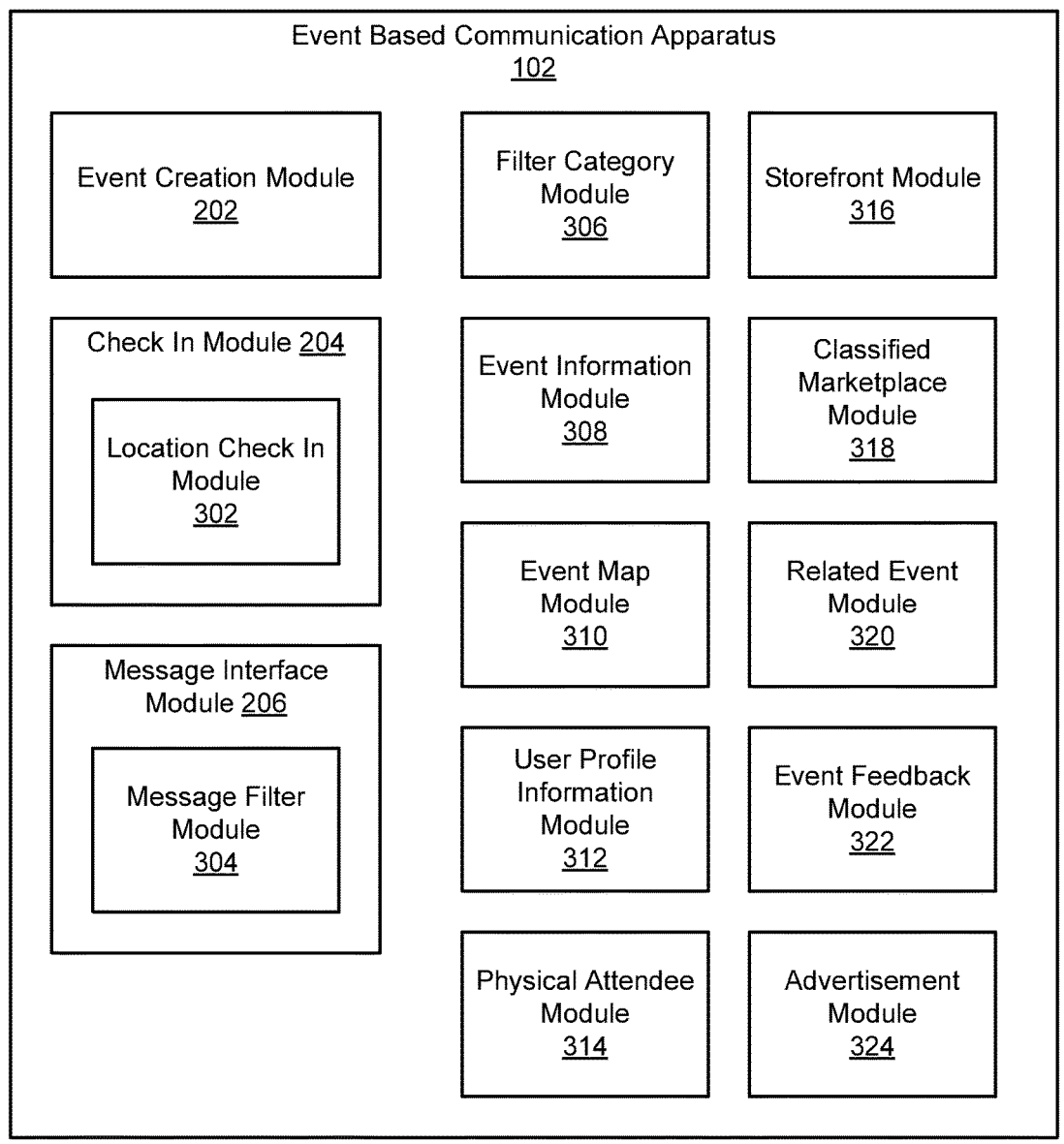
FIG. 3 is a schematic block diagram illustrating another embodiment of an apparatus for facilitating networked communication.

FIG. 3 depicts another embodiment of an apparatus 300 for facilitating networked communication. The apparatus 300 includes an embodiment of the event based communication apparatus 102, which includes an event creation module 202, a check in module 204, and a message interface module 206, substantially as described above with reference to FIG. 2. In the depicted embodiment of the apparatus 300, the event based communication apparatus 102 also includes a filter category module 306, an event information module 308, an event map module 310, a user profile information module 312, a physical attendee module 314, a storefront module 316, a classified marketplace module 318, a related event module 320, an event feedback module 322, and an advertisement module 324, which are described below. The check in module 204, in the depicted embodiment, may include a location check in module 302. The message interface module 206, in the depicted embodiment, may include a message filter module 304.

In one embodiment, the filter category module 306 is configured to use a plurality of filter categories associated with an event profile to categorize each user profile of the plurality of user profiles that the check in module 204 associated with the event profile. For example, a user may select a filter category such as business, dating, friendship, or the like when checking into an event. Then, as the check in module 204 associates the user's profile with the event profile, the filter category module 306 categorizes the user's profile by using the selected filter category.

In general, the filter category module 306 divides the users who are checked in to an event (or their user profiles) into different categories for the event. Categorizing the users who are checked in to an event allows users to find other users on the social networking service 104 who are looking for the same type of social interaction. For example, the filter category module 306 may categorize the users who are checked in to an event into a business category, a dating category, and a friendship category. Then, in a further embodiment, each user who is checked in to the event may be able to see how the filter category module 306 has categorized each of the other users who are checked in to the event, so that people looking for friendship can make contact with other people looking for friendship, and avoid misunderstandings with people looking for dating relationships. Similarly, the people looking for business contacts at the event could make contact with other people looking for business contacts, instead of with people trying to find dates, or new friends.

In one embodiment, the plurality of filter categories associated with an event profile may include a business category, a dating category, and/or a friendship category. In a further embodiment, the filter categories for an event profile may include further categories. For example, in one embodiment, the filter categories for an event profile may include a promotional category definable by an administrator for promoting a business, a location, a good, and/or a service associated with the event profile. For example, if the event profile is for a trade show, an administrator may define a promotional category for promoting one of the vendors at the trade show. Then, users checking into the trade show could check in under the promotional category to indicate their affiliation with, or interest in the promoted vendor. In a certain embodiment, the administrator may define the promotional category to promote an advertiser, a sponsor of the event profile, or the like. In one embodiment, the administrator may be an administrator for the social networking service 104. In another embodiment, the administrator may be an administrator for the event profile.

In one embodiment, the filter category module 306 may categorize user profiles that the check in module 204 has associated with multiple event profiles, by using a category for each event. For example, a user visiting a city for a business conference may check in to the conference under the "business" category, but may simultaneously check into a venue for an evening social event under the "friendship" category. Each event profile may use similar or varying filter categories, in various embodiments. For example, in one embodiment, each event may use "business," "dating," and "friendship" categories, with an optional promotional category. However, in another embodiment, the filter categories for a trade show might include "vendor" and "job fair" categories, while the filter categories for a lakeside campground might include "boating" and "hiking" categories. It is clear, in light of this disclosure, that the filter category module 306 may use a variety of filter categories to categorize user profiles associated with an event.

In one embodiment, the event information module 308 displays information about the event profile. Displaying information may, in various embodiments, include presenting a web page, application screen, or the like, for display by a client 110 using a monitor, screen reader, or other display technology. In various embodiments, information about the event profile may include information about the event itself and/or information about users who are checked in to the event.

In one embodiment, the event information module 308 may display information about the event profile including one or more links to one or more user profiles of the plurality of user profiles that the check in module 204 associated with the event profile. Displaying links to the user profiles that have checked in to the event profile allows users to easily identify the other users at the event. In a certain embodiment, the event information module 308 displays the link to each user profile along with a link to contact that user over the message interface provided by the message interface module 206.

In one embodiment, the event information module 308 may display information about the event profile in video format. For example, in a certain embodiment, the event information module 308 may use a video display to provide live updates with links to user profiles, as users check in to the event. In some embodiments, the event information module 308 may also display one or more video feeds with one or more of the links to user profiles. For example, a user with a mobile client 110 may provide streaming video from the user's location, which the event information module 308 may display with the link to the user's profile. In further embodiments, streaming video from the user's location may also include streaming audio, such as music selected by the user. In another embodiment, if a video feed is not available for a checked in user, the event information module 308 may display a picture for the user profile in place of a video feed.

In one embodiment, the event information module 308 uses a plurality of filter categories associated with the event profile to categorize the one or more links to user profiles. In a further embodiment, the event information module 308 uses the same filter categories as the filter category module 306, so that it displays links to user profiles for the event based on the categories selected when each user checked in to the event. In another embodiment, the event information module 308 may use additional or different filter categories than the filter category module 306, to further categorize the links it displays to user profiles. For example, if the filter category module 306 categorized a user profile at an event using the dating category, the event information module 308 may use the same "dating" category to display links to all the user profiles checked in to the event for dating, or may use additional filter categories to display links by gender, height, or any other category of interest to people in the "dating" category. The additional filter categories may be based on information in a user's profile, or may be based on information requested from a user when they check in to the event.

In the depicted embodiment, the event map module 310 is configured to display a map that includes at least one link to an event profile. In a certain embodiment, the link is positioned at a location on the map corresponding to a location for the event profile. In a further embodiment, the event map module 310 may display a map with multiple links to multiple event profiles, positioned at appropriate locations on the map. Displaying a map with links to event profiles provides an easy way for users to find events. In another embodiment, users may find events in another way, including by using a list or directory of events, or an event search. In a certain embodiment, the event map module 310 may selectively display links to event profiles, based on one or more categories or event types selected by a user. For example, in one embodiment, a user may select the category of "outdoor events" so that the event map module 310 will display links to event profiles for outdoor events, but will omit other events.

In one embodiment, the event map module 310, or other modules providing a list or directory of events, an event search, or any other method of finding event profiles, may use a location for a user profile to selectively display links to event profiles for events near the user. Determining a location for a user profile is described below with reference to the physical attendee module 314. Selectively displaying events near the user allows users to more easily find events near them. As an example of selectively displaying events, in some embodiments, the event map module 310 may determine the location for a user profile within a city, and display the map zoomed in to that city, with links to nearby events in the city. By displaying links to event profiles on a city map, instead of on a world or national map, the event map module 310 facilitates easily finding nearby events.

In one embodiment, the user profile information module 312 may be configured to display information about a user profile. Information about a user profile may include information entered by the user and/or information about activity of that user profile on the social networking service 104. In one embodiment, information about one user profile may include a list of "viewed user profiles," which are user profiles viewed or otherwise accessed on the social networking service 104 by the user of the one user profile. In another embodiment, information about one user profile may include a list of "viewer" user profiles, which are user profiles whose users have viewed or otherwise accessed the one user profile on the social networking service 104. In a certain embodiment, the information displayed by the user profile information module 312 may include links to viewed user profiles and/or links to viewer user profiles. In such an embodiment, users can easily see a history of which user profiles they have viewed, and which user profiles have been used to view their own user profiles. Seeing these user profiles may suggest users to contact by using the message interface.

In the depicted embodiment, the physical attendee module 314 is configured to categorize at least one user profile of the plurality of user profiles which the check in module 204 associated with the event profile as a physical attendee for the event profile. In a certain embodiment, the physical attendee module 314 may categorize a user profile as a physical attendee in response to determining that a location for the user profile satisfies one or more location criteria for the event profile. In a further embodiment, the physical attendee module 314 may categorize user profiles that are not physical attendees for an event profile as virtual attendees for the event profile. Categorizing user profiles as physical or virtual attendees for an event facilitates users meeting in real life. For example, if two users are checked in to an event under a "dating" category, they may use the message interface to become acquainted, but may eventually wish to meet in real life. If they can see that they are both physical attendees for the event, they may arrange to meet immediately at the event. However, if one or both users is a virtual attendee for the event, they may arrange to meet later, at a convenient location for both of them.

The physical attendee module 314 may determine a location for the user profile based on geolocation data from a client 110, information entered by the user, or the like. For example, in one embodiment, if a user's client 110 is a global positioning system ("GPS") enabled mobile phone, the physical attendee module 314 may determine a location for the user's profile based on GPS, cell tower, and/or wireless access point location data from the phone. In another embodiment, if a user's client 110 is a desktop computer, the physical attendee module 314 may determine the location based on a geographic database index of internet protocol ("IP") addresses, or simply based on information entered by the user.

In one embodiment, the physical attendee module 314 may use a location for a user profile to determine if the location satisfies one or more location criteria for the event profile. Location criteria may be based on default location criteria, or may be specified for each event profile, in various embodiments. For example, in one embodiment, the physical attendee module 314 may use default location criteria specifying that a user is a physical attendee at an event if the user profile's location is within one quarter mile of the event. In another embodiment, the physical attendee module 314 may use different location criteria for a different event. For example, in one embodiment, the location criteria for a city-wide event profile may specify that any user within the city limits is a physical attendee. Alternatively, in another embodiment, the location criteria for an event at a small venue may specify that physical attendees are in the venue, not just within a quarter mile.

In the depicted embodiment, the storefront module 316 is configured to provide a storefront interface associated with an event profile. In one embodiment, a storefront interface allows users to buy goods and/or services associated with the event. For example, in a certain embodiment, a storefront interface may be displayed along with information from the event profile, and may include links to goods sold by a sponsor of the event. In a further embodiment, the storefront interface may provide e-commerce functionality such as a "shopping cart" allowing users to buy goods and/or services online within the social networking service 104.

In one embodiment, the storefront interface may allow users to purchase additional filter categories for the event profile, such as one or more promotional filter categories as described above with reference to the filter category module 306. In another embodiment, the storefront interface may allow users to purchase an increased display priority, so that the event information module 308 would display links to user profiles with the increased display priority before links to other user profiles. An increased display priority may be used to increase the exposure of a user profile to other users. In yet another embodiment, the storefront interface may allow private businesses to sell goods and/or services over the social networking service 104 in connection with an event. In light of this disclosure, other attributes that may be included in a storefront interface are clear.

In one embodiment, the classified marketplace module 318 is configured to provide a classified marketplace interface associated with the event profile. In a certain embodiment, a classified marketplace interface allows users to place advertisements associated with the event profile, and respond to advertisements. For example, in one embodiment, a vendor at a trade show event may use a classified marketplace interface associated with the event profile to advertise the vendor's products, and to respond to queries received from other users in response to the advertisements. In light of this disclosure, other attributes that may be included in a classified marketplace interface are clear.

In one embodiment, the related event module 320 is configured to cooperate with the event information module 308 to display information about an event profile that includes one or more links to related event profiles. In various embodiments, related event profiles may share similar locations, involve similar types of activities, or the like. Displaying related event profiles allows users who check in to one event to find similar events they may want to check in to. For example, in one embodiment, a user planning to attend Yellowstone National Park may check into an event profile for the park, and see related event profiles for lodging and campgrounds near the park. In light of this disclosure, many uses are clear for related event profiles.

In the depicted embodiment, the event feedback module 322 is configured to cooperate with the event information module 308 to display information about the event profile that includes user feedback about the event profile. In a further embodiment, the event feedback module 322 may provide a feedback interface for users to leave feedback about an event profile, and may display that feedback. In various embodiments, user feedback may include star rankings, comments about the event, or the like. In light of this disclosure, it is clear that many types of user feedback may be gathered and displayed in many ways.

In one embodiment, the advertisement module 324 is configured to cooperate with the event information module 308 to display information about the event profile that includes advertisements. In various embodiments, advertisements displayed by the advertisement module 324 may include banner advertisements, pop-up advertisements, pop-under advertisements, or the like. Displaying advertisements with the event profile may provide a revenue source to support the event, or the social networking service 104. In light of this disclosure, it is clear that the advertisement module 324 may display advertisements in many ways.

In one embodiment, the check in module 204 includes a location check in module 302. In a certain embodiment, the check in module 204 may associate a user profile with the event profile by using the location check in module 302 to determine that a location for the user profile satisfies one or more location criteria for the event profile. The location check in module 302 may determine a location for a user profile, and location criteria for the event profile in the manner discussed above with reference to the physical attendee module 314. In certain embodiments, if the user's location satisfies the location criteria for the event, the location check in module 302 may automatically check that user in to the event. In one embodiment, the location check in module 302 may automatically check a user into an event in response to receiving authorization from the user to check in, either generally, or for a specific event.

In one embodiment, the message interface module 206 includes a message filter module 304. In a certain embodiment, the message filter module 304 adds a message filter to the message interface. In a further embodiment, where the message interface is operable by a first user to send a message to a second user, the message filter is operable by the second user to block one or more messages from the first user. In one embodiment, the message filter may block messages from the first user for a period of time selected by the second user. In another embodiment, the message filter may block messages from the first user indefinitely, unless or until the second user decides to un-block the messages. Blocking messages allows users to avoid undesired messages. For example, in one embodiment, if a user is receiving undesired messages from another user at a dating event, he or she can block messages from that user, and focus on contacting other people at the event.

Figure 4:
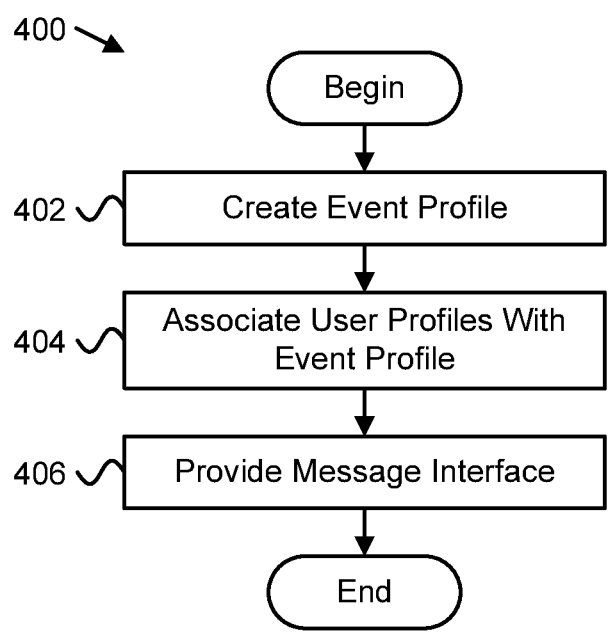
FIG. 4 is a schematic flow chart diagram illustrating one embodiment of a method for facilitating networked communication.

FIG. 4 depicts an embodiment of a method 400 for facilitating networked communication. The method 400 begins and creates 402 an event profile within the social networking service 104. For example, in one embodiment, the event creation module 202 creates 402 the event profile. The method 400 associates 404 a plurality of user profiles of the social networking service 104 with the event profile. For example, in one embodiment, the check in module 204 associates 404 user profiles with the event profile. The method 400 provides 406 a message interface operable by a first user of the social networking service 104 to send a private message to a second user of the social networking service 104 in response to determining that a user profile of the first user and a user profile of the second user are associated with the event profile, and the method 400 ends. In one embodiment, the message interface module 206 provides 406 the message interface.

Figure 5:
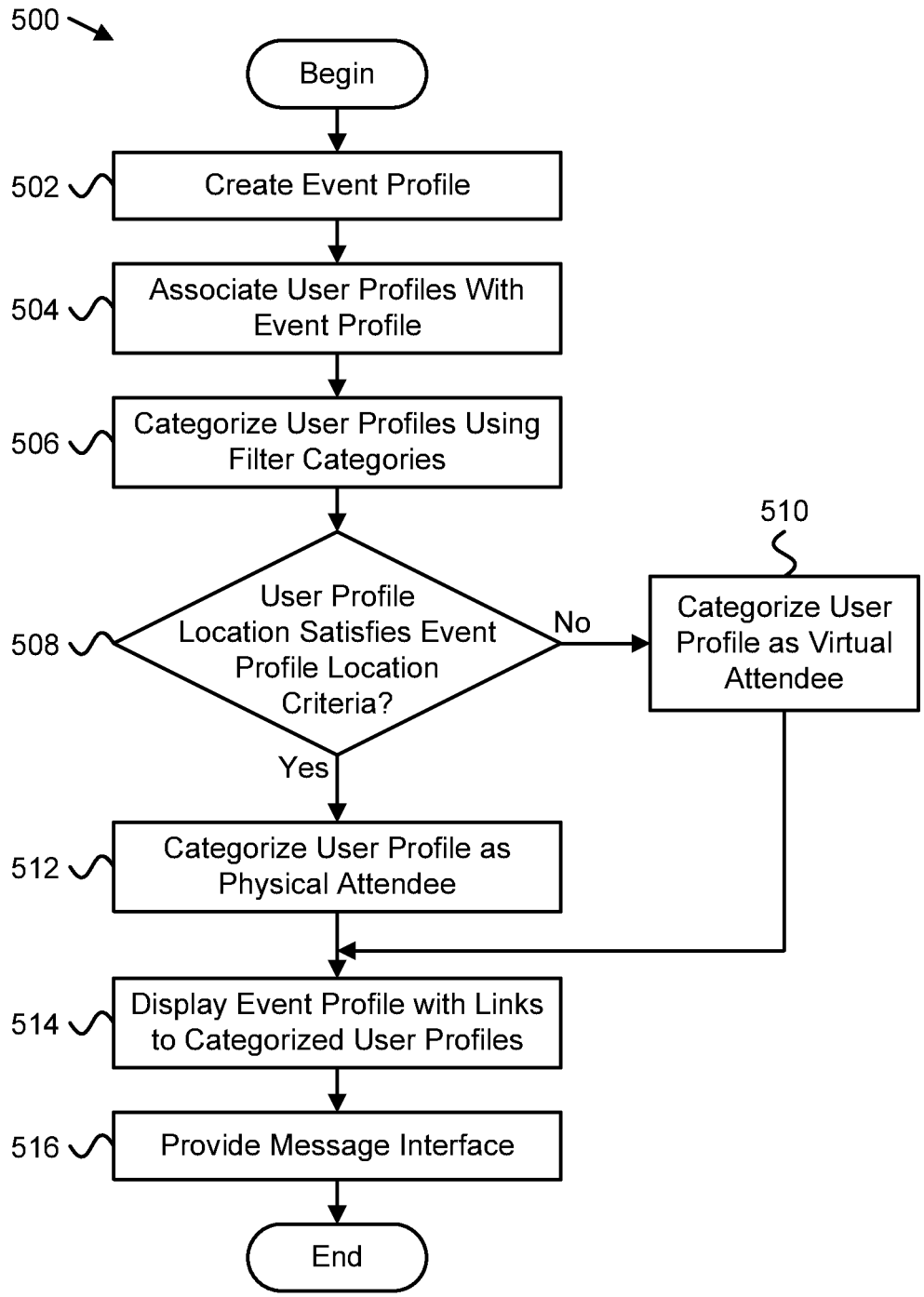
FIG. 5 is a schematic flow chart diagram illustrating another embodiment of a method for facilitating networked communication.

FIG. 5 depicts another embodiment of a method 500 for facilitating networked communication. The method 500 begins and creates 502 an event profile within the social networking service 104. For example, in one embodiment, the event creation module 202 creates 502 the event profile. The method 500 associates 504 a plurality of user profiles of the social networking service 104 with the event profile. For example, in one embodiment, the check in module 204 associates 504 user profiles with the event profile. The method 500 categorizes 506 user profiles associated with the event profile, using filter categories. In one embodiment, the filter category module 306 categorizes 506 the user profiles.

The method 500 determines 508 if a location for a user profile associated with the event satisfies location criteria for the event profile. If so, the method 500 categorizes 512 the user profile as a physical attendee for the event. If not, the method 500 categorizes 510 the user profile as a virtual attendee for the event. In one embodiment, the physical attendee module 314 determines 508 if the location for the user profile satisfies event profile location criteria, and categorizes 510, 512 the user profile as a virtual or physical attendee. The method 500 displays 514 information about the event profile with categorized links to user profiles based on the filter categories and/or the categorization of each user profile as a physical or virtual attendee. In one embodiment, the event information module 308 displays 514 information about the event profile with links to categorized user profiles.

The method 500 provides 516 a message interface operable by a first user of the social networking service 104 to send a private message to a second user of the social networking service 104 in response to determining that a user profile of the first user and a user profile of the second user are associated with the event profile, and the method 400 ends. In one embodiment, the message interface module 206 provides 516 the message interface.

Figure 6:
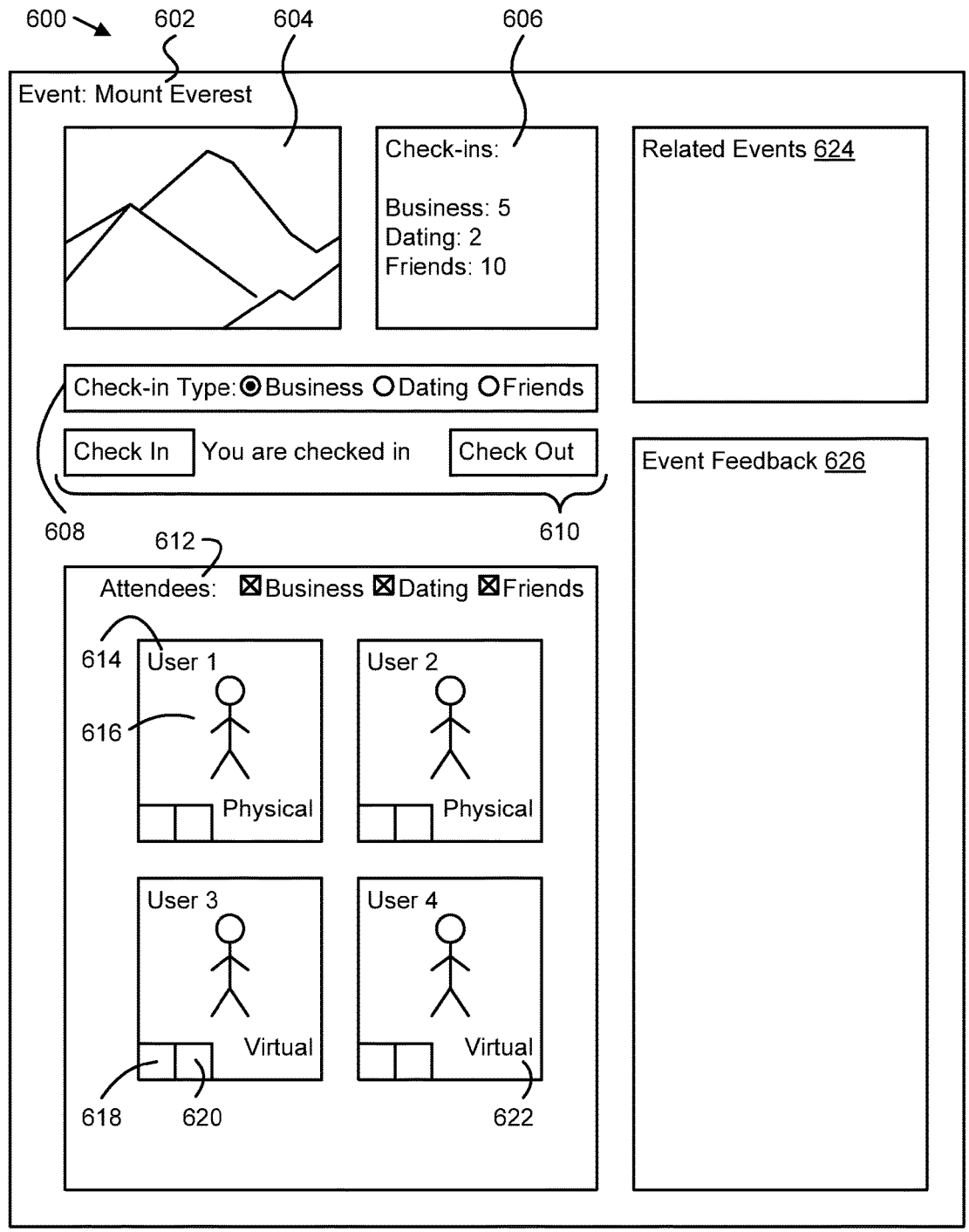
FIG. 6 is an example of a web page illustrating one embodiment of event based communication.

FIG. 6 is an example of a web page 600 illustrating one embodiment of event based communication. In the depicted embodiment, the event information module 308 users the web page 600 to display information about the event to a user. In one embodiment, the web page 600 includes a name 602 for the event. In a further embodiment, the web page 600 includes a picture 604 for the event. In a certain embodiment, the web page 600 includes a summary 606 of how many users are checked in to the event in each of the filter categories used by the filter category module 306 for the event. In one embodiment, the web page 600 includes controls 610 for the check in module 204, allowing a user to check in or check out of the event, and indicating whether the user is currently checked in or checked out. In a further embodiment, the web page 600 includes controls 608 for the filter category module 306, allowing the user to check in under the "business," "dating," or "friends" category.

In one embodiment, the event information module 308 uses the web page 600 to display links to user profiles of event attendees 612, in one or more of the "business," dating," and "friends" filter categories. In a certain embodiment, each link to a user profile may include the user's name 614. In a further embodiment, each link to a user profile may include the user's picture 616. In one embodiment, the user's name 614 and picture 616 be the user's actual name and picture. In another embodiment, the user's name 614 and/or picture 616 may be selected by the user, for the user profile, without being the user's actual name and/or picture. For example, a user may create a user profile for an object, with the name 614 and picture 616 of the object.

Each link to a user profile may include additional links 618, 620, in certain embodiments. For example, in the depicted embodiment, one link 618 may activate the message interface module 206 to provide a message interface to send an email message. As a further example, in the depicted embodiment, another link 620 may activate the message interface module 206 to provide a message interface that opens a chat session with the user. In one embodiment, each link to a user profile may also include a categorization 622 of the user as a physical or virtual attendee, from the physical attendee module 314.

In one embodiment, the web page 600 may include links 624 to related event profiles, from the related event module 320. In further embodiment, the web page 600 may include user feedback 626 about the event profile, from the event feedback module 322. In various embodiments, the event information module 308 may cooperate with various other modules to display more or less information about the event profile on a web page 600.

Figure 7:
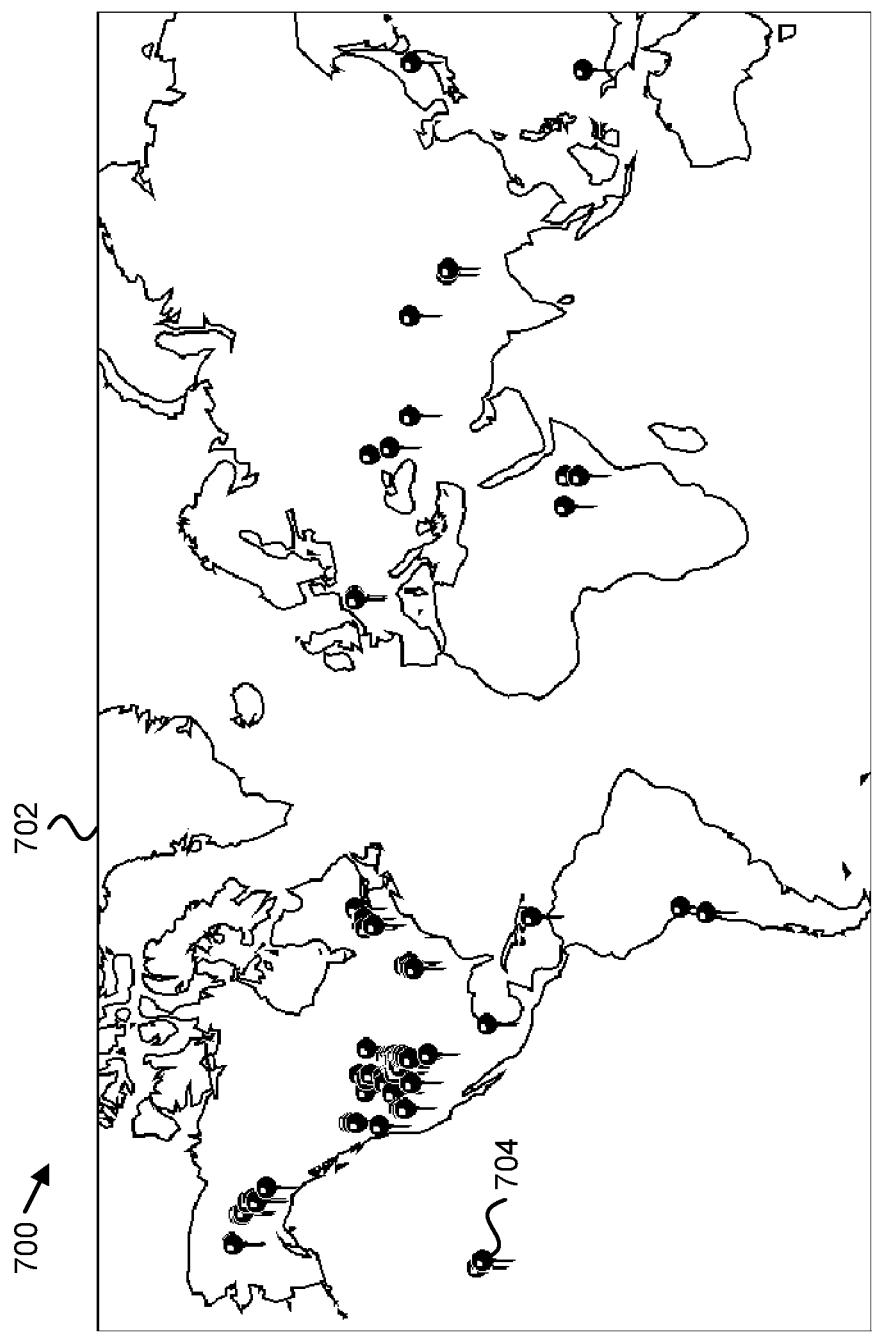
FIG. 7 is an example of a web page illustrating another embodiment of event based communication.

FIG. 7 is an example of a web page 700 illustrating another embodiment of event based communication. In the depicted embodiment, the event map module 310 uses the web page 700 to display a map 702. In a further embodiment, the map 702 includes links 704 to event profiles so that each link 704 is positioned at a location on the map 702 corresponding to a location for the linked event profile.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method for facilitating networked communication, the method comprising:
creating an event profile within a social networking service;
associating a plurality of user profiles of the social networking service with the event profile;
providing a message interface operable by a first user of the social networking service to send a private message to a second user of the social networking service, in response to determining that a user profile of the first user and a user profile of the second user are associated with the event profile;
using a plurality of filter categories associated with the event profile to categorize each user profile of the plurality of user profiles associated with the event profile, the plurality of filter categories comprising one or more of a business category, a dating category, and a friendship category, wherein categorizing a user profile for a user comprises presenting an interface for the user to select a filter category from the plurality of filter categories for the user's own user profile; and
displaying an event profile page, the event profile page comprising a page for the event profile with information about the event profile and links, on the event profile page, to multiple user profiles selected from the plurality of user profiles based on one or more of the filter categories.

2. The method of claim 1, wherein the plurality of filter categories further comprises a promotional category definable by an administrator for promoting one or more of a business, a location, a good, and a service associated with the event profile.

3. The method of claim 1, wherein associating a plurality of user profiles with the event profile comprises determining that a location for at least one user profile satisfies one or more location criteria for the event profile.

4. The method of claim 1, wherein the private message comprises one or more of an email message, a chat message, a video message, and an audio message.

5. The method of claim 1, further comprising providing a storefront interface associated with the event profile.

6. The method of claim 1, further comprising providing a classified marketplace interface associated with the event profile.

7. An apparatus for facilitating networked communication, the apparatus comprising:
an event creation module configured to create an event profile within a social networking service;
a check in module configured to associate a plurality of user profiles of the social networking service with the event profile;
a message interface module configured to provide a message interface operable by a first user of the social networking service to send a private message to a second user of the social networking service, in response to determining that a user profile of the first user and a user profile of the second user are associated with the event profile;
a filter category module configured to use a plurality of filter categories associated with the event profile to categorize each user profile of the plurality of user profiles associated with the event profile, the plurality of filter categories comprising one or more of a business category, a dating category, and a friendship category, wherein the filter category module categorizes a user profile for a user by presenting an interface for the user to select a filter category from the plurality of filter categories for the user's own user profile; and
an event information module configured to display an event profile page, the event profile page comprising a page for the event profile with information about the event profile and links, on the event profile page, to multiple user profiles selected from the plurality of user profiles based on one or more of the filter categories;
wherein the modules comprise one or more of a hardware circuit, a programmable hardware device and a processor executing code stored on a non-transitory computer readable medium.

8. The apparatus of claim 7, further comprising an event map module configured to display a map comprising a link to the event profile, the link positioned at a location on the map corresponding to a location for the event profile, wherein the event map module comprises one or more of a hardware circuit, a programmable hardware device and a processor executing code stored on a non-transitory computer readable medium.

9. The apparatus of claim 7, wherein the message interface provided by the message interface module is operable by the second user to block one or more messages from the first user.

10. The apparatus of claim 7, further comprising a user profile information module configured to display information about one user profile, the information comprising one or more of a link to a viewed user profile and a link to a viewer user profile, wherein the user profile information module comprises one or more of a hardware circuit, a programmable hardware device and a processor executing code stored on a non-transitory computer readable medium.

11. The apparatus of claim 7, further comprising a physical attendee module configured to categorize at least one user profile of the plurality of user profiles as a physical attendee for the event profile, in response to determining that a location for the at least one user profile satisfies one or more location criteria for the event profile, wherein the physical attendee module comprises one or more of a hardware circuit, a programmable hardware device and a processor executing code stored on a non-transitory computer readable medium.

12. The apparatus of claim 7, further comprising a related event module configured to display information about the event profile, the displayed information comprising one or more links to one or more related event profiles, wherein the related event module comprises one or more of a hardware circuit, a programmable hardware device and a processor executing code stored on a non-transitory computer readable medium.

13. The apparatus of claim 7, further comprising an event feedback module configured to display information about the event profile, the displayed information comprising user feedback about the event profile, wherein the event feedback module comprises one or more of a hardware circuit, a programmable hardware device and a processor executing code stored on a non-transitory computer readable medium.

14. The apparatus of claim 7, further comprising an advertisement module configured to display information about the event profile with advertisements, wherein the advertisement module comprises one or more of a hardware circuit, a programmable hardware device and a processor executing code stored on a non-transitory computer readable medium.

15. A computer program product comprising a non-transitory computer readable medium storing computer usable program code executable to perform operations for facilitating networked communication, the operations comprising:

creating an event profile within a social networking service;

associating a plurality of user profiles of the social networking service with the event profile;

providing a message interface operable by a first user of the social networking service to send a private message to a second user of the social networking service, in response to determining that a user profile of the first user and a user profile of the second user are associated with the event profile;

using a plurality of filter categories associated with the event profile to categorize each user profile of the plurality of user profiles associated with the event profile, the plurality of filter categories comprising one or more of a business category, a dating category, and a friendship category, wherein categorizing a user profile for a user comprises presenting an interface for the user to select a filter category from the plurality of filter categories for the user's own user profile; and displaying an event profile page, the event profile page comprising a page for the event profile with information about the event profile and links, on the event profile page, to multiple user profiles selected from the plurality of user profiles based on one or more of the filter categories.

\* \* \* \* \*